Nov. 1, 1955 G. D. FORBES ET AL 2,722,600
ELECTRONIC AUTOMATIC GAIN CONTROL DEVICE
Filed Aug. 12, 1952
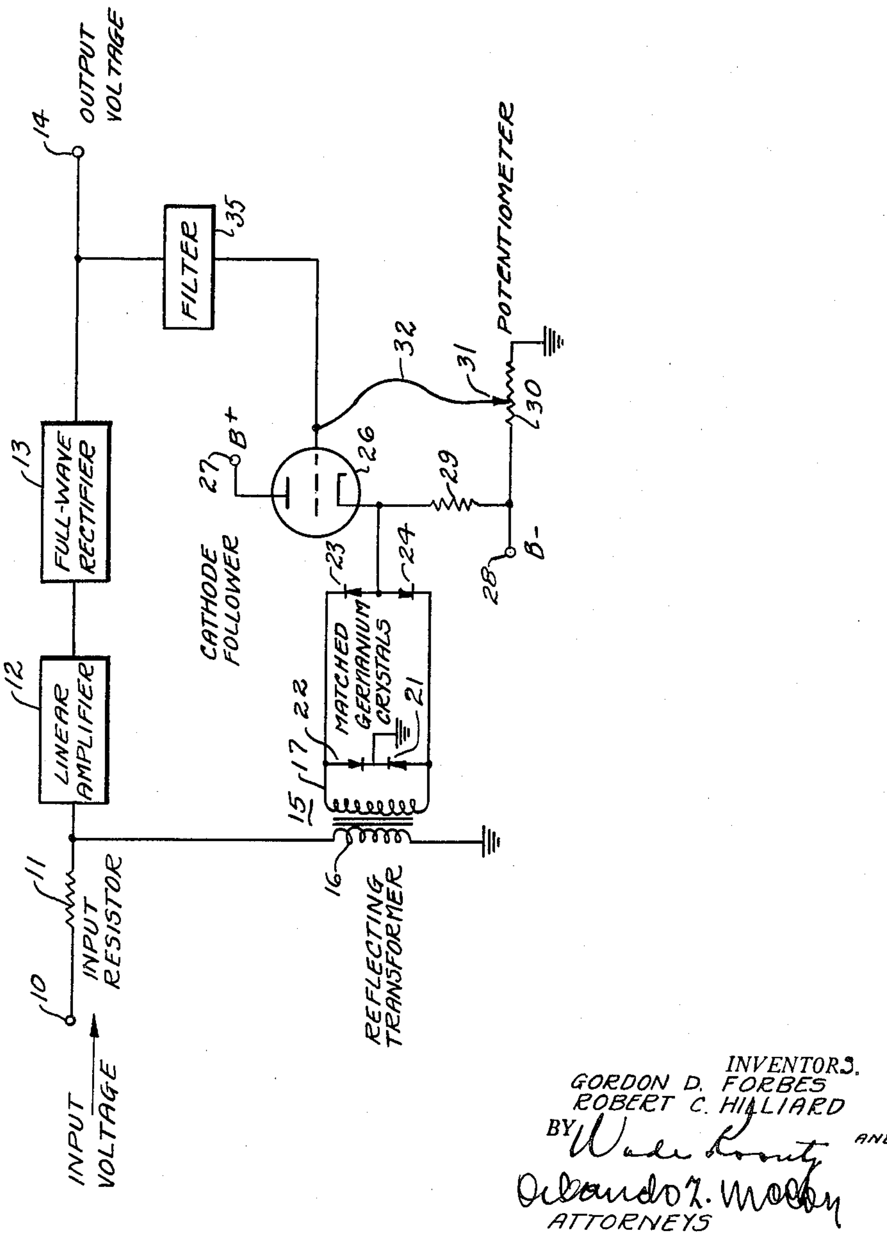
INVENTORS.
GORDON D. FORBES
ROBERT C. HILLIARD
BY Wade Koontz AND
Orlando Z. Molloy
ATTORNEYS United States Patent Office
2,722,600
Patented Nov. 1, 1955

2,722,600

ELECTRONIC AUTOMATIC GAIN CONTROL DEVICE

Gordon Donald Forbes, Sudbury, and Robert C. Hilliard, Beverly Farms, Mass.

Application August 12, 1952, Serial No. 303,866
3 Claims. (Cl. 250—20)

This invention relates to automatic electronic gain control and more particularly to a volume compression circuit or a reflected impedance modulator circuit for use therein.

In the past radio receiver practice, automatic volume or gain control has served to maintain a carrier voltage at a receiver detector as nearly constant as possible. A favorite method of accomplishing this result has been by biasing the grids of the radio frequency, intermediate frequency, and sometimes the converter tubes negatively with a direct current voltage derived by rectifying the carrier. With this equipment a signal increase increases the negative bias and thereby tends to counteract the increased signal by reducing the amplification. Conversely with a signal decrease the automatic control bias is correspondingly decreased and the gain of the controlled tubes is increased. This provision compensates for variations in received signal strength. In past ordinary automatic volume control circuitry where a unipolar control voltage has been fed back to a tube grid for the purpose of modulating the transconductance of the tube and where the unipolar control voltage has been returned to the tube grid with a short time constant feedback, oscillations occur where the control voltage and the signal voltage have frequencies common to both spectra and also both sum terms and product terms appear in the output.

A volume compressor reduces the amplification when the signal being amplified is large and increases the amplification when the signal is small. Volume compressors are used commonly in long distance short-wave radiotelephone circuits.

The reflected impedance modulator or volume compressor that is disclosed herein provides a means for constant gain modulation which introduces only product terms in the output. The product term gain modulation of the reflected impedance modulator is obtained by using a nonlinear resistance opposing an applied voltage characteristic of a bridge of four matched germanium crystals and the automatic variable impedance reflecting property of a transformer.

An object of the present invention is to provide a device that meets the need of controlling the average output level of receiver equipment such as a receiver or the like, with a control voltage of which the frequency spectrum has some frequencies in common with the spectrum of the signals to be controlled.

Another object is to provide a device applicable to a moving target indicator system and that minimizes the overloading of a plan position indicator oscilloscope of a dynamic range in the order of 15 decibels impedance with a cancellation residue illustratively of up to 30 decibels that prevents the observation of useful information in the points of overload.

A further object is to provide a device applicable to a moving target indicator system for providing a short time constant gain modulation automatic means for compressing the average variations in video cancellation residues with a video control voltage to nearly a constant level and with no sum terms appearing in the output of the circuit. This reduces the probability of oscillations or undesired resonance at certain frequencies.

An illustrative embodiment of the present invention is shown in the single figure of the accompanying drawing of a block and schematic circuit diagram.

In the accompanying drawing, an input terminal 10 is connected in series with an input resistor 11, a linear amplifier 12 and a full-wave rectifier 13, the output from which is available at an output terminal 14. The linear amplifier 12 and the full-wave rectifier 13 are connected in parallel with another group of components connected in series from the output end of the input resistor 11 at its junction with the linear amplifier 12, to the output end of the full-wave rectifier 13 at its junction with the output contact 14.

The parallel group of series connected components comprises a reflecting transformer 15, a bridge of four matched germanium crystals 21, 22, 23 and 24, a cathode follower tube 26 and a filter 35.

The reflecting transformer 15 comprises a primary winding 16 and a secondary winding 17. The germanium crystals 21, 22, 23 and 24 are connected in a bridge as shown with the junction of the crystals 21 and 22 grounded. The junction of the crystals 23 and 24 is connected to the cathode of the cathode follower tube 26. The cathode of the tube 26 is connected to ground through both legs of the bridge or through the series connected crystals 23 and 22 in parallel with the series connected crystals 24 and 21. The secondary winding 17 of the transformer 15 has its opposite ends connected to ground through the bridge crystals 22 and 21.

The cathode follower tube 26 has B plus voltage from a source 27 applied to its plate and B— voltage from a source 28 applied through a resistor 29 to its cathode. The cathode of the tube 26 is connected to ground through the resistor 29 in series with a potentiometer resistor 30. A potentiometer tap 31 is adapted for being adjustably applied to the potentiometer resistor 30 and is connected through a lead 32 with the grid of the cathode follower tube 26.

The product term gain modulation of the reflected impedance modulator in the accompanying drawing is obtained by using non-linear resistance against the applied voltage characteristic of the bridge of matched germanium crystals 21, 22, 23 and 24 and the variable impedance reflecting property of the transformer 15.

The linear amplifier 12 amplifies signal at the junction of the amplifier 12 and the resistor 11 and the primary winding 16 of the reflecting transformer 15 to a predetermined level for the operation of the circuit. The signal is full-wave rectified by the rectifier 13.

The full-wave rectified signal in the output of the rectifier 13 is applied through the filter 35 to the grid of the cathode follower tube 26. With any increase in signal voltage and with a pre-established circuit time constant, the filtered voltage on the grid of the cathode follower tube 26 increases the level of the voltage at the tube cathode at its junction with the bridge matched germanium crystals 23 and 24. The potentiometer 30, 31 provides a fine adjustment of the cathode follower bias.

The four germanium bridge crystals 21, 22, 23 and 24 are a commercially available matched set. The higher the voltage across the germanium crystals 21, 22, 23 and 24 between the cathode follower tube 26 and the secondary winding 17 of the reflecting transformer 15, the lower their apparent resistance becomes and the lower becomes the reflected impedance seen through the transformer 15. This reflected impedance together with the impedance of the input resistor 11 cause the resistor 11 and the transformer 15 to act as a voltage divider. The smaller the value of the reflected impedance and the greater the attenuation in the voltage divider provided by the input resistor 11 and the transformer 15, the greater becomes the attenuation in the voltage divider.

As the output voltage tends to increase with increasing input, the attenuation at the input end of the linear amplifier 12 increases and tends to maintain a constant output level of voltage at the output terminal 14.

The fine adjustment of the cathode follower bias provided by the potentiometer 30, 31 permits the use of the non-linear full range of the bridge of matched germanium crystals 21, 22, 23 and 24 at a predetermined output level. It may be noted that if the crystals 21 and 22 and the crystals 23 and 24 are perfectly matched, varying voltage components do not appear across the transformer 15 and hence do not appear at the input to the linear amplifier 12. This characteristic of the disclosed circuit permits the suppression of the sum terms of input and control voltages.

The perfection of the match of the bridge germanium crystals 21, 22, 23 and 24 minimizes the probability of oscillations and undesired resonance at certain frequencies.

The disclosed circuit provides short time constant gain modulation action with no sum terms appearing at the circuit output terminal 14.

Since the transformer 15 serves as a variable impedance it may be replaced by other similarly functioning components within the scope of the present invention.

It is to be understood that the circuitry that is disclosed herein has been submitted for the purposes of illustrating and explaining the present invention and that substitutions of components and modifications in the circuitry may be made without departing from the scope of the present invention.

What we claim is:

1. A volume compression circuit, comprising an input terminal at which signal appears, an input resistor introducing resistance to the passage of signal at said input terminal, a linear amplifier amplifying the output from said input resistor, a full-wave rectifier rectifying both positive going and negative going output from said linear amplifier, filter means filtering the full-wave rectified output from said full-wave rectifier, a cathode follower vacuum tube having a grid to which the output from said filter is applied and having an anode to which positive plate potential is applied and having a cathode, a cathode resistor through which a negative potential is applied to said tube cathode, a potentiometer resistor in series with said cathode resistor between the tube cathode and ground and said potentiometer resistor adjustably contacted by a potentiometer tap connected through a tap lead to the grid of said tube, a bridge of four matched germanium crystals connected at its input end to the cathode of said tube and connected to ground at its end remote from the tube cathode connection, and an iron core reflecting transformer having a primary winding connected between the junction of said input resistor with said linear amplifier and ground and a secondary winding connected across said bridge and said transformer introducing impedance to the output of said input resistor at its junction with said linear amplifier.

2. In an electronic automatic gain control device, a volume compression circuit having as components therein an input resistor to an input end of which an input voltage is applied and having an output end, a linear amplifier connected electrically to the output end of said input resistor to provide an amplification thereof in the output from the linear amplifier, a full wave rectifier connected electrically to the output end of the linear amplifier and providing in the full wave rectifier output the full wave rectified amplified output from the input resistor, a reflecting transformer having a primary winding connected between the output end of the input resistor and ground and having a secondary winding inductively coupled to the reflecting transformer primary winding, a crystal bridge having a pair of alternating current terminals shunted by the secondary winding of the reflecting transformer and having a pair of direct current terminals of which one is applied directly to ground and the other provides output for the bridge, a cathode follower vacuum tube having a cathode electrode electrically connected to the direct current output terminal of the crystal bridge and the vacuum tube having also grid and plate electrodes, and a filter connected between the grid electrode of the vacuum tube and the output end of the full wave rectifier providing the output voltage terminal for the gain control device.

3. The circuit in the above claim 2, inclusive of an adjustable variable bias on the grid electrode of the cathode follower vacuum tube.

References Cited in the file of this patent

UNITED STATES PATENTS

| | | |
|---|---|---|
| 2,021,474 | Bartholemew et al. | Nov. 19, 1935 |
| 2,252,002 | Halsey | Aug. 12, 1941 |
| 2,557,888 | Olson | June 19, 1951 |
| 2,558,002 | Ross | June 26, 1951 |